United States Patent Office
3,201,402
Patented Aug. 17, 1965

3,201,402
MONOCYCLIC CARBOCYCLIC AROMATIC AMINE
Hans Bohler, Rheinfelden, Fritz Kehrer, Basel, and Piero Maderni, Binningen, Switzerland, assignors to Sandoz Ltd., Basel, Switzerland, a Swiss firm
No Drawing. Filed July 21, 1959, Ser. No. 828,469
Claims priority, application Switzerland, July 29, 1958, 62,362, amendments thereto, Nov. 28, 1958, Mar. 24, 1959; July 9, 1959, 75,538
13 Claims. (Cl. 260—279)

This invention relates to a process for the production of pigment dyestuffs of the quinacridine-7,14-dione series, which consists in reacting 1 mole of a 2,5-dihalogeno-terephthalic acid or one of its esters either simultaneously or successively with 2 moles of an aromatic amine or of a mixture of different aromatic amines, in which at least one position ortho to the amino group is free, and converting the resulting 2,5-diarylaminoterephthalic acid or its ester into a quinacridine-7,14-dione by heating at a high temperature in an acid condensation medium, if desired in presence of an inert organic solvent.

In the process disclosed herein the 2,5-dihalogeno-terephthalic acid or its ester is condensed with the aromatic amine or amines in a polar solvent or a mixture of polar solvents such as water, low molecular alcohols, glycerine, ethylene glycol, propylene glycol, polyethylene glycol or water-ethylene glycol mixtures or water-glycerine mixtures etc. in presence of metallic copper or a copper compound and of a suitable acid-binding agent in the pH region of 2 to 12, preferably between pH 4 and pH 9, and at temperatures above 70° C., e.g. between 70° and 160° C.

Condensation can be carried out in one step, but it is preferably conducted in two steps using in the second step the same amine or a different amine or a mixture of amines.

Examples of suitable amines are aminobenzene, 2-, 3- and 4-methyl-, -methoxy-, -chloro- and -nitro-1-aminobenzenes, the amino-dimethyl-benzenes, amino-methyl-chloro-benzenes, amino-methyl-methoxybenzenes, amino-methoxy-chlorobenzenes, amino-methyl-nitrobenzene, amino-methoxy-nitrobenzenes, amino-chloro-nitrobenzenes, amino-dinitrobenzenes, amino-dichloro- and amino-trichlorobenzenes.

Suitable copper compounds are, e.g., cupric acetate, chloride, sulfate, oxide or hydroxide, cuprous oxide and cuprous chloride, and organic copper salts such as copper octoate, copper benzoate or the copper salt of 2,5-dihalogenoterephthalic acid, while the preferred metallic copper is Raney copper. It is advisable to employ only a small amount of the copper salt or Raney copper, e.g. 1 to 10% on the weight of the 2,5-dihalogenoterephthalic acid. However, an equimolecular amount of the copper compound may also be used.

Of the acid-binding agents of interest for the process, the following may be cited: sodium and potassium carbonate, bicarbonate and acetate, monosodium, monopotassium, disodium and dipotassium phosphate, borax or an excess of the aromatic amine or amines employed. The acid-binding agent is added before the start of the reaction, or in small portions during the course of the reaction in solid, finely powdered form or in solution. In the latter case a solution of sodium or potassium hydroxide can also be used as acid-binding agents. A sufficient amount of the agent is added to bring the pH of the reaction mixture within the desired limits.

One mode of operation of the process which is of particular interest consists in boiling with reflux the copper salt of the 2,5-dihalogenoterephthalic acid with an excess of one of the above-defined amines in water in presence of an acid-binding agent such as sodium or potassium acetate, and separating the condensation product by acidification with hydrochloric acid. The reaction mixture, which depending upon the conditions chosen may be directed to contain predominantly mono-condensation products, e.g. 2-chloro-5-arylaminoterephthalic acid, or dicondensation products, e.g. 2,5-diarylaminoterephthalic acid, is separated by dissolving the raw product in dilute sodium hydroxide solution followed by fractional precipitation with acid. With decreasing pH value the reaction products are obtained as technically pure compounds in the order 2,5-diarylaminoterephthalic acid, 2-chloro-5-arylaminoterephthalic acid and 2,5-dichloroterephthalic acid. The 2-chloro-5-arylaminoterephthalic acid is condensed in the described manner, e.g. in ethylene glycol, preferably at temperatures above 100° C., with a further molecule of an aromatic amine, which may be the same as or different from that used in the first step of the condensation, or alternatively a mixture of amines.

The hitherto unknown asymmetric and symmetric 2,5-diarylamino-terephthalic acids produced by the above described process are crystalline compounds of red to violet color. The 2-halogeno-5-arylaminoterephthalic acids, which have been but little described in the literature and are in great part unknown, are substances of yellow to orange color.

The main lines of the process as described above can be varied in accordance with the character of the chosen amine and the desired degree of mono- or dicondensation. The possibility of choosing the desired degree of condensation is a special advantage of the process, since it permits the operation to be carried through monocondensation to a second condensation giving new and hitherto unknown asymmetric 2,5-diarylaminoterephthalic acids, e.g. 2-phenylamino-5-(nitroarylamino)-terephthalic acid, and by ring closure of the latter to arrive at the hitherto unknown quinacridones of the process, e.g. mononitro-quinacridone.

The ring closure to give the quinacridone is accomplished by heating the 2,5-diarylaminoterephthalic acid or its ester at temperatures above 120° C. with an acid condensation agent, e.g. phosphate pentoxide, boric acid, 60–85% sulfuric acid, 50–85% borosulfuric acid, but preferably polyphosphoric acid or more than 75% $P_2O_5$ content, and if desired in presence of an inert organic solvent, e.g. cymene, dichlorobenzene or nitrobenzene. By working with polyphosphoric acid in the temperature range 130° to 250° C., the quinacridine-7,14-dione can often be obtained in nearly quantitative yield.

A special advantage of this ring closure process using polyphosphoric acid is that diarylaminoterephthalic acid esters, which can be produced by the process described by H. Liebermann in the Annalen der Chemie 404, 272 (1914), are also convertible into the appropriate quinacridones in excellent yield without previous saponification.

A special mode of operation of the polyphosphoric acid process consists in mixing the diarylaminoterephthalic acid with an excess of $P_2O_5$ and carefully adding water so that a solution of not less than 75% $P_2O_5$ is formed, this then being heated at 150–160° C. The quinacridone so formed is isolated by the addition of water and if necessary purified by dissolving in a solution of dimethylsulfoxide and alcoholic potassium hydroxide followed by filtration and subsequent precipitation of the filtrate with water.

As is evident from U.S. Patents 2,844,484, 2,844,485 and 2,844,581, the unsubstituted linear quinacridone (quinacridine-7,14-dione) first synthesized by H. Libermann and described in the Annalen 518, 245 (1935), can be obtained in an α-, β- or γ-crystal phase.

A further advantage of the polyphosphoric acid process for the production of quinacridones is that, after ring closure, the quinacridone or its derivative is present in solution in the acid and can be directly converted by suitable precipitation into the desired crystalline form. The same result is achieved when a solvent suitable for the purpose is used to purify the crude quinacridone; during the process of purification the solvent converts the quinacridone into the desired crystalline form.

Thus when a quinacridone solution, as obtained after ring closure of diphenylaminoterephthalic acid with polyphosphoric acid, is poured into water, for example, the quinacridone is obtained in the α crystal phase. If however the polyphosphoric acid solution containing the quinacridone is carefully diluted with water while still hot, a mixture of the α and β crystal phases with the latter phase predominant is produced. Again, the crude quinacridone may be purified by heating with dimethylsulfoxide to give the β crystal phase, whereas if the purification is carried out by dissolving in dimethylsulfoxide containing alcoholic potassium hydroxide solution and carefully precipitating by the addition of water, the quinacridone is obtained in the γ crystal phase.

A number of the quinacridone dyestuffs obtainable according to the present process are new, namely those having the formula

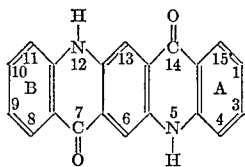

in which at least one of the nuclei A and B contains a substituent of the groups halogen atoms, nitro groups, low molecular alkyl or alkoxy groups, and in which each of the nuclei A and B—when they are identical and contain only one type of substituent—contain at least one nitro group, at least two low molecular alkyl groups, at least two low molecular alkoxy groups or at least three halogen atoms, and in which not more than two low molecular alkyl or alkoxy groups are in the positions 1, 4, 8 and 11.

After suitable processing, the orange to blue quinacridones obtained according to the present process can be employed for the coloration of plastics, in particular polyvinyl chloride, of aqueous dispersions of synthetic resins for paints, of printing inks, of lacquers, of spinning solutions of viscose rayon, cellulose 2½-acetate of cellulose triacetate, of rubber, of high-quality papers, and for the pigment printing of textile fabrics. Certain members are also suitable for the mass dyeing of polypropylene, synthetic polyamides (e.g. Perlon, registered trademark) and polyesters (e.g. Terylene, registered trademark).

The colors produced in paints, lacquers, synethic resin dispersions and polyvinyl chloride, the spin dyeings of viscose and acetate fibers, and the textile prints are characterized, besides their good all-round fastness properties, by brightness of shades and very good to outstanding fastness to light.

Especially notable features are the outstanding fastness to top finishes of paints and lacquers, and, the excellent fastness to migration of polyvinyl chloride colored with the dyestuffs, and the good to very good color fastness to water, washing, perspiration, cross dyeing, alkalis, acids, peroxide bleaching and dry cleaning of viscose and acetate fibers and of prints on textile fabrics.

In the following examples the parts and percentages are by weight and the temperatures are in degrees centigrade.

EXAMPLE 1

11.8 parts of 2,5-dichloroterephthalic acid,
15 parts of anhydrous potassium carbonate,
55 parts of ethylene glycol,
12.5 parts of water, and
76 parts of aminobenzene are boiled in a flask equipped with a reflux condenser for 5½ hours at 120–125° in presence of 2.5 parts of potassium iodide and 0.2 part of anhydrous copper acetate. The reaction product is diluted with water, precipitated by the addition of hydrochloric acid, and purified by redissolving in a dilute aqueous solution of ammonium or sodium hydroxide. By acidification of the solution with acetic acid, the 2,5-diphenylaminoterephthalic acid is crystallized out and filtered off. On further acidification of the mother liquor with a mineral acid, e.g. hydrochloric acid, the 2-chloro-5-phenylaminoterephthalic acid is precipitated.

2,5-dichloroterephthalic acid can be replaced by another 2,5-dihalogenoterephthalic acid, e.g. 2,5-difluoroterephthalic acid, 2,5-dibromoterephthalic acid or 2,5-diiodoterephthalic acid or by a mixed dihalogenoterephthalic acid, e.g. 2-chloro-5-fluoroterephthalic acid.

The anhydrous potassium carbonate may be replaced by the equivalent quantity of anhydrous sodium carbonate, sodium or potassium bicarbonate, dessicated borax, dessicated disodium or dipotassium phosphate or dessicated mixtures of monosodium/disodium phosphate or monopotassium/dipotassium phosphate.

The dicondensation product 2,5-diphenylaminoterephthalic acid can also be obtained by the following procedure.

11.7 parts of sodium 2-chloro-5-phenylaminoterephthalate, obtainable as described in Example 6, are dissolved at pH 7.5 in 250 parts of water in a vessel equipped with a stirring device and reflux condenser. The solution is heated to 95–98°; first 9.5 parts of butyric acid (d.=0.947) are added, then dropwise 35 parts of aminobenzene and afterwards 2 parts of potassium fluoride and 0.2 part of copper acetate.

The mixture is then boiled for 24 hours with stirring and the product processed further as described above.

The 2-chloro-5-phenylaminoterephthalic acid can also be replaced by an equivalent amount of 2-bromo-5-phenylaminoterephthalic acid.

The solvent mixture of ethylene glycol and water can also be replaced by other polar solvents, e.g. water, ethylene glycol, propylene glycol, glycerine, polyethylene glycol, and low molecular alcohols, or a mixture of water and glycerine.

The copper acetate may be replaced by the same quantity of cupric sulfate, chloride, benzoate, hydroxide or oxide, by cuprous chloride or oxide or by Raney copper.

In place of aminobenzene, substituted aromatic amines can be used in which case the corresponding substituted diarylaminoterephthalic acids are obtained.

Ring closure giving quinacridone takes place when 2 parts of diphenylaminoterephthalic acid and 30 parts of polyphosphoric acid with a $P_2O_5$ content of 85% are heated for 15 minutes at 155–160°. The end product, quinacridine-7,14-dione, is precipitated by diluting the polyphosphoric acid with water at 80–100°. The yield is very good and the slightly bluish red product is of high purity.

For carrying out ring closure, the ratio of diphenylaminoterephthalic acid to polyphosphoric acid can be varied within wide limits. When a ratio of 1:5, for example, is chosen, the product is obtained in high yield.

X-ray photographs show that the product is a mixture of two crystallographically different quinacridones which are described in United States Patents 2,844,484 and 2,844,485. The greater proportion of the mixture is the product described in the second of these patents.

Depending on the conditions of the final operations, products of different crystal forms are obtained. For example, if 26 parts of the polyphosphoric acid containing the quinacridone at 155–160° is run into 500 parts of water at 20° stirred with a polytron stirrer, heated for 15 minutes at 80°, filtered off while hot and dried, a powder of an intense red to red-violet color is obtained which is identical with the product described in U.S. Patent 2,844,484 and gives a red shade in polyvinyl chloride. The 500 parts of water can be replaced by 500 parts of 2-normal ammonia or 500 parts of 2-normal sodium hydroxide solution.

A product crystallographically the same is obtained when 1 part of the above-described crude mixture is dissolved in 10 parts of concentrated sulfuric acid or in a mixture of 30 parts of dimethyl sulfoxide and 3.5 parts of 10% alcoholic potassium hydroxide solution, the solution run into 200 or 400 parts of ice-water and the whole boiled for 30 minutes, after which the precipitate formed is filtered off and dried.

A violet-colored quinacridone which is crystallographically different from those previously described is obtained when 1 part of the mixture produced according to the present example is boiled with 25 parts of dimethyl sulfoxide for 4 hours with reflux and allowed to stand in this solvent for a further 84 hours. The product is isolated by dilution with water. X-ray photography reveals it as identical with the product described in U.S. Patent 2,844,485, its shade in polyvinyl chloride being violet.

Another modification is obtained when 1 part of the crude mixture is dissolved in a mixture of 32 parts of dimethyl sulfoxide and 3.6 parts of 10% alcoholic potassium hydroxide solution, the blue solution filtered free from impurities if necessary, and water added at approximately 100° until precipitation starts, the pure pigment being subsequently filtered off at room temperature.

This modification is also obtained when 1 part of the crude quinacridone mixture is dissolved in a mixture of 50 parts of dimethyl formamide and 2 parts of 10% alcoholic potassium hydroxide solution and water added to the boiling solution until precipitation is initiated, upon which the pigment can be filtered off at room temperature.

The pure quinacridone, as it can be obtained by recrystallization from polar solvents, e.g. dimethyl formamide, dimethyl sulfoxide, ethylene glycol, or from mixtures of 10% alcoholic potassium hydroxide solution and dimethyl formamide or dimethyl sulfoxide, or by recrystallization from concentrated sulfuric acid, gives in concentrated sulfuric acid solution at 20° in the visible region an absorption spectrum which is characterized by the positions of the following main absorption bands (wave numbers in cm.$^{-1}$): 16,650, 18,070, 19,420, 20,770 and 25,800. The absorption spectrum in concentrated sulfuric acid is independent of the different forms revealed by X-ray photography.

The quinacridone mixture and the isolated modifications can be used for the pigmentation of various substrates as stated in the foregoing description of the process. The pigment colorations and the textile prints are outstandingly fast to light and migration.

EXAMPLE 2

11.8 parts of 2,5-dichloroterephthalic acid,
34.6 parts of anhydrous potassium carbonate,
220 parts of ethylene glycol,
50 parts of water,
50 parts of 1-amino-2-methyl-4-chlorobenzene hydrochloride, and
5 parts of potassium iodide in the presence of
0.2 parts of anhydrous copper acetate are boiled with reflux for 12 hours at 120–125°. The reaction product is processed further according to the particulars given in Example 1. The product is 2,5-di-(2'-methyl-4'-chlorophenylamino)-terephthalic acid and 2 - chloro - 5 - (2'-methyl-4'-chloro)-phenylaminoterephthalic acid.

The excess amine can be blown out of the alkaline reaction medium with steam, either before precipitation with hydrochloric acid or after completion of precipitation from the alkaline mother liquor.

The 1-amino-2-methyl-4-chlorobenzene hydrochloride can be replaced by the free amine, in which case the amount of potassium carbonate must be proportionately reduced.

Ring closure resulting in the quinacridone derivative can be carried out by the method described in the seventh paragraph of Example 1. One obtains 2,9-dichloro-4,11-dimethylquinacridine-7,14-dione as a red powder.

The absorption spectrum in the visible region of the new quinacridone derivative in concentrated sulfuric acid at 21° is characterized by the position of the following main absorption bands (wave numbers in cm.$^{-1}$): 16,180, 17,570, 18,890 and 20,100.

After suitable processing, the 2,9-dichloro-4,11-dimethylquinacridine-7,14-dione can be used for pigmenting various substrates of the types mentioned in the description. The pigment colorations and textile prints are outstandingly fast to migration and very fast to light. Polyvinyl chloride is colored a yellow-red.

EXAMPLE 3

58.8 parts of 2,5-dichloroterephthalic acid,
500.0 parts of ethylene glycol,
380.0 parts of 1-amino-3-nitrobenzene, and
1.0 part of copper acetate are heated for 24 hours at 100°,
50.0 parts of anhydrous potassium acetate are added and the temperature maintained at 100° for a further 70 hours. The reaction product is processed as described in Example 1 to give 2,5-di-(3'-nitro-phenylamino)-terephthalic acid and 2 - chloro - 5-(3'-nitro)-phenylaminoterephthalic acid.

Ring closure to form the quinacridone derivative is conducted according to the method described in Example 1, paragraph 7, except that the temperature is maintained at 155° for 25 instead of only 15 minutes, and is subsequently increased and maintained at 175° for a further 60 minutes.

The purified quinacridone derivative, which it is assumed to consist mainly of 3,10-dinitroquinacridine-7,14-dione, may also be 1,8- or 1,10-dinitroquinacridine-7,14-dione or a mixture of the three substances.

Speaking generally, it may be said that ring closure of 2,5-di-(3'-substituted)-arylamino - terephthalic acids admits of three possibilities for the formation of 3-quinacridine-7,14-diones, namely 3,10-, 1,8 and 1,10-substituted quinacridine-7,14-diones, whilst with the 2-arylamino - 5-(3' - substituted)-arylaminoterephthalic acids either 3- or 1-substituted quinacridones may be formed.

The product of the present example yields red-violet colorations and textile prints which are outstandingly fast to migration and very fast to light.

EXAMPLE 4

A further variation of the method of ring closure leading to formation of the quinacridone as described in Example 1, paragraph 7, is to replace the 2 parts of diphenylaminoterephthalic acid by 2 parts of diphenylaminoterephthalic acid diethyl ester. A bluish red powder is obtained which is identical with the end product of Example 1 and shows the same absorption characteristics. In this case also three different modifications can be obtained depending upon the conditions of the production process.

EXAMPLE 5

94.4 parts of 2,5-dichloroterephthalic acid,
800 parts of ethylene glycol,
608 parts of aminobenzene, and
1.6 parts of copper acetate are heated at 140° for 8 hours.

The mass is treated further as described in Example 1 to form 2,5-diphenylaminoterephthalic acid and 2- chloro-5-phenylaminoterephthalic acid. The latter can be purified by redissolving in dilute potassium hydroxide solution and reprecipitating.

When 120 parts of anhydrous potassium acetate are added to the reaction mass of this example, and the mixture heated at 100° for 16 hours, the proportion of 2,5-diphenylaminoterephthalic acid in the end product can be markedly increased. If one wishes to produce almost exclusively the monocondensation product, 2-chloro-5-phenylaminoterephthalic acid, the procedure described in the next example is preferable.

EXAMPLE 6

A solution of 8.6 parts of crystallized copper sulfate in 40 parts of water is added dropwise at 90–95° in 10–15 minutes with vigorous stirring to a solution of 7.05 parts of 2,5-dichloroterephthalic acid and 5.04 parts of sodium bicarbonate in 100 parts of water. The precipitated copper salt is filtered with suction at 80–90° and washed. It is suspended in a solution of 95 parts of water, 1 part of potassium fluoride, 2.5 parts of anhydrous sodium acetate and 7.5 parts of acetic acid. The suspension is brought to the boil and 21 parts of aminobenzene are added over the next 15 minutes. After boiling for 20 hours with reflux the suspension is acidified at 70–80° with 30 parts of concentrated hydrochloric acid. The precipitated product is filtered with suction at 20° and freed from any superficially attached aminobenzene by washing with dilute hydrochloric acid. It is then suspended in 200 parts of water at 20°, adjusted with sodium hydroxide to give a phenolphthalein alkaline reaction, stirred for 2 hours and filtered. Acetic acid is added to the solution at 75–80° so that it reacts acid to litmus paper and is freed from any small amounts of dicondensation products which may be present. At the same temperature the solution is adjusted with hydrochloric acid to react weakly acid to Congo paper (pH 2–3) and the precipitated monocondensation product is isolated. It is 2-chloro-5-phenyl-aminoterephthalic acid and is obtained in good yield.

When the 2,5-dichloroterephthalic acid of the present example is replaced by 2,5-dibromoterephthalic acid, a mixture of 2-bromo-5-phenylaminoterephthalic acid and 2,5-diphenylaminoterephthalic acid is obtained in which the ratio of 2,5-diphenylaminoterephthalic acid to 2-bromo-5-phenylaminoterephthalic acid is greater than when 2,5-dichloroterephthalic acid is used as starting material.

16.8 parts of the 2-chloro-5-phenylaminoterephthalic acid of this example,
200 parts of ethylene glycol,
3.75 parts of anhydrous potassium carbonate,
15 parts of anhydrous potassium acetate,
2.9 parts of potassium fluoride,
42.5 parts of 1-amino-2-methyl-4-chlorobenzene, and
0.2 part of copper acetate are heated for 16 hours at 140°. The reaction mass is diluted with water, the product precipitated by acidification with hydrochloric acid, purified by dissolving in dilute ammonia solution, and precipitated by acidifying the solution with acetic acid.

One can also arrive at 2-phenylamino-5-(2'-methyl-4'-chloro)-phenylaminoterephthalic acid by condensing a 2-halogeno-5-(2'-methyl-4'-chloro)-phenylaminoterephthalic acid, e.g. 2-chloro-5-(2'-methyl-4'-chloro)-phenyl-aminoterephthalic acid (Example 2) with aminobenzene.

Ring closure giving the quinacridone is carried out in the way described in Example 1, paragraph 7. The precipitated crude 2-chloro-4-methylquinacridone-7,14-dione is best purified by redissolving in concentrated sulfuric acid or in a mixture of dimethyl sulfoxide and alcoholic potassium hydroxide solution, followed by precipitation with water as described in Example 1. Alternatively, it can be recrystallized in polar solvents, e.g. dimethyl formamide or ethylene glycol.

In the visible region of the spectrum the absorption of the purified 2-chloro-4-methylquinacridine-7,14-dione in concentrated sulfuric acid at 21° is characterized by the positions of the following main absorption bands (wave numbers in cm.$^{-1}$): 16,500, 17,900, 19,200, 20,500, 25,600. The red dyeings, colorations and prints obtained with the 2-chloro-4-methylquinacridine-7,14-dione are outstandingly fast to migration and very fast to light.

EXAMPLE 7

16.8 parts of 2-chloro-5-phenylaminoterephthalic acid, produced by the methods described in Examples 1, 5 or 6,
200 parts of ethylene glycol,
3.75 parts of anhydrous potassium carbonate,
48.6 parts of 1-amino-3,4-dichlorobenzene,
2.9 parts of potassium fluoride,
15.0 parts of anhydrous potassium acetate, and
0.2 parts of copper acetate are heated for 16 hours at 140°. The 2-phenylamino-5-(3',4'-dichloro)-phenylaminoterephthalic acid is processed further according to the details of Example 1, and ring closure is carried out by the method of Example 1, paragraph 7, to give the quinacridone. On purification a 2,3-dichloroquinacridine-7,14-dione or a 1,2-dichloroquinacridine-7,14-dione or a mixture of the two is obtained. The absorption spectrum of the reaction product in concentrated sulfuric acid at 21° is characterized in the visible region by the positions of the following main absorption bands (wave numbers in cm.$^{-1}$): 16,500, 17,900, 19,250, 20,600.

The violet-red colorations and prints produced with the quinacridone are outstandingly fast to migration and very fast to light.

EXAMPLE 8

A mixture of 8.1 parts of 2,5-dibromoterephthalic acid,
100 parts of water,
120 parts of methanol,
3.7 parts of anhydrous potassium carbonate,
5.0 parts of anhydrous potassium acetate,
12.3 parts of 1-amino-3-methoxybenzene,
12.8 parts of 1-amion-2-chlorobenzene, and
0.4 part of copper acetate are boiled with reflux for 16 hours at 70° and further processed on the lines of Example 1. The method of ring closure is also as described in paragraph 7 of Example 1. The red colorations and prints produced with the products are outstandingly fast to migration and have very good light fastness.

With another low molecular alcohol (ethanol, n-propanol, isopropanol or butanol) similar results are obtained.

EXAMPLE 9

5 parts of 2,5-diphenylaminoterephthalic acid diethyl ester are heated with 150 parts of 78.5% sulfuric acid for 15 minutes at 205°, allowed to cool and then run into water. The precipitated quinacridone is purified by one of the methods described in Example 1.

A similar result is obtained when 5 parts of the ester are mixed with 25 parts of boric acid, heated first to 120°, and then to 320°, maintained for 1 hour at 320° and run into water.

The 2,5-diphenylaminoterephthalic acid diethyl ester of this example can be replaced by an equal quantity of 2,5-diphenylaminoterephthalic acid. The sulfuric acid likewise can be replaced by a mixture of crystallized boric acid and 78.5% sulfuric acid in the proportion of 1:10.

In the following table further examples are listed.

The quinacridine-7,14-diones are obtained by ring closure of a 2,5-diarylaminoterephthalic acid of the formula:

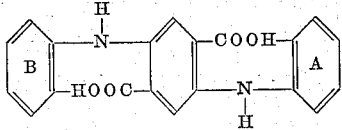

which can also be employed in the form of its ester, they are characterized in the table by the nuclei A and B in columns (I) and (II) and by the shade of the colors produced in polyvinyl chloride with the pigment (column (III)).

Table

| Example No. | Aryl radical A (I) | Aryl radical B (II) | Shade in Polyvinyl chloride (III) |
|---|---|---|---|
| 10 | 2-nitrophenyl | 2-nitrophenyl | Red. |
| 11 | Phenyl | 2-methylphenyl | Do. |
| 12 | ----do---- | 3-methylphenyl | Do. |
| 13 | ----do---- | 2-methoxyphenyl | Violet-red. |
| 14 | ----do---- | 3-methoxyphenyl | Red. |
| 15 | ----do---- | 4-methoxyphenyl | Violet-blue. |
| 16 | ----do---- | 2-chlorophenyl | Yellow-red. |
| 17 | ----do---- | 3-chlorophenyl | Red. |
| 18 | ----do---- | 4-chlorophenyl | Violet-red. |
| 19 | ----do---- | 3-ethylphenyl | Red. |
| 20 | ----do---- | 3-ethoxyphenyl | Do. |
| 21 | ----do---- | 2-fluorophenyl | Yellow-red. |
| 22 | ----do---- | 2-bromophenyl | Do. |
| 23 | ----do---- | 3-fluorophenyl | Red. |
| 24 | ----do---- | 3-bromophenyl | Do. |
| 25 | ----do---- | 4-fluorophenyl | Violet-red. |
| 26 | ----do---- | 4-bromophenyl | Do. |
| 27 | ----do---- | 2,4-dichlorophenyl | Red. |
| 28 | ----do---- | 2,5-dichlorophenyl | Do. |
| 29 | ----do---- | 3,4-dichlorophenyl | Violet-red. |
| 30 | ----do---- | 2,3-dichlorophenyl | Red. |
| 31 | ----do---- | 2,4,5-trichlorophenyl | Do. |
| 32 | ----do---- | 2-nitrophenyl | Violet-red. |
| 33 | ----do---- | 3-nitrophenyl | Red. |
| 34 | ----do---- | 4-methylphenyl | Violet-red. |
| 35 | 2-methylphenyl | 3-methylphenyl | Red. |
| 36 | 3-methylphenyl | 4-ethylphenyl | Do. |
| 37 | 2-methylphenyl | 3-methoxyphenyl | Do. |
| 38 | 4-methylphenyl | 2,4-dimethylphenyl | Violet-red. |
| 39 | 2-methoxyphenyl | 3-methoxyphenyl | Red. |
| 40 | 3-ethoxyphenyl | ----do---- | Do. |
| 41 | 4-methoxyphenyl | 2,4-dimethoxyphenyl | Violet. |
| 42 | 2-chlorophenyl | 3-chlorophenyl | Yellow-red. |
| 43 | ----do---- | 2-bromophenyl | Do. |
| 44 | ----do---- | 2,4-dichlorophenyl | Red. |
| 45 | ----do---- | 2,5-dichlorophenyl | Yellow-red. |
| 46 | ----do---- | 3,4-dichlorophenyl | Red. |
| 47 | ----do---- | 2,3-dichlorophenyl | Do. |
| 48 | ----do---- | 2,5-dibromophenyl | Yellow-red. |
| 49 | ----do---- | 2,4-dibromophenyl | Red. |
| 50 | 2,3-dichlorophenyl | 2,4-dichlorophenyl | Do. |
| 51 | 2,4,5-trichlorophenyl | 2,4,5-trichlorophenyl | Do. |

Having thus disclosed the invention what we claim is:
1. 4,11-dinitroquinacridine-7,14-dione.
2. 2 - phenylamino - 5 - (2'-methyl-4'-chloro)-phenylaminoterephthalic acid.
3. 2-phenylamino - 5 - (3',4'-dichloro)-phenylaminoterephthalic acid.
4. 2 - (3'-methoxy)-phenylamino-5-(2'-chloro)-phenylaminoterephthalic acid.
5. 2-phenylamino - 5 - (3' - halogeno) - phenylamino terephthalic acid.
6. 2-phenylamino - 5 - (4' - halogeno) - phenylamino terephthalic acid.
7. 2-phenylamino - 5 - (2' - halogeno) - phenylamino terephthalic acid.
8. 2-phenylamino - 5 - (3' - methoxy) - phenylamino terephthalic acid.
9. 2,5-di-(2'-nitro)-phenylamino terephthalic acid.
10. Symmetrical quinacridine-7,14-dione of the formula:

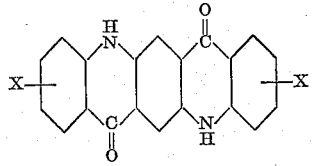

wherein the symbols X represent nitro groups.

11. In the preparation of di-arylamino-terephthalic acid compound, the improvement which consists essentially of (I) reacting, at a temperature between 70° and 160° C. and with a pH range of from 2 to 12 in contact with (A) copper catalyst, (B) acid-binding agent, and (C) polar solvent selected from the group consisting of water, low molecular alcohol of from 1 to 4 carbon atoms, glycerine, ethylene glycol, propylene glycol and polyethylene glycol, (1) one mole of a member selected from the group consisting of a 2,5-dihalogenoterephthalic acid and a 2,5-dihalogenoterephthalic acid ester with (2) one mole of a monocyclic carbocyclic aromatic amine, wherein from 1 to 2 of the positions ortho to the amino group are free, whereby a monohalogeno - monoarylamino - terephthalic acid compound is obtained, and (II) reacting, at a temperature between 70° and 160° C. and within a pH range of from 2 to 12 in contact with (A) copper catalyst, (B) acid-binding agent and (C) polar solvent selected from the group consisting of water, low molecular alcohol of from 1 to 4 carbon atoms, glycerine, ethylene glycol, propylene glycol and polyethylene glycol, (3) one mole of said monohalogeno-monoarylamino-terephthalic acid compound with (4) one mole of a member selected from the group consisting of (a) the same aromatic amine as employed in step I, (b) another monocyclic carbocyclic aromatic amine wherein from 1 to 2 of the positions ortho to the amino group are free, and (c) a mixture of said aromatic amines.

12. A process which consists essentially of reacting, at a temperature between 70° and 160° C. and within a pH range of from 2 to 12 in contact with (1) copper catalyst, (2) acid-binding agent, and (3) polar solvent selected from the group consisting of water, low molecular alcohol of from 1 to 4 carbon atoms, glycerine, ethylene glycol, propylene glycol and polyethylene glycol, one mole of a member selected from the group consisting of a 2,5-dihalogenoterephthalic acid and a 2,5-dihalogenoterephthalic acid ester with a member selected from the group consisting of (a) two moles of a monocyclic carbocyclic aromatic amine, wherein from 1 to 2 of the positions ortho to the amino group are free, (b) one mole of one monocyclic aromatic amine of the benzene series and one mole of another monocyclic aromatic amine of the benzene series, from 1 to 2 of the positions ortho to the amino group in each of said amines being free, and (c) two moles of a mixture of monocyclic carbocyclic aromatic amines, from 1 to 2 of the positions ortho to the amino group in each of said amines being free.

13. In the preparation of di-arylamino-terephthalic acid compounds, the improvement which consists essentially of (I) reacting, at a temperature between 70° and 160° C. and within a pH range of from 2 to 12 in contact with (A) finely divided metallic copper catalyst, (B) acid-binding agent, and (C) polar solvent selected from the group consisting of water, low molecular alcohol of from 1 to 4 carbon atoms, glycerine, ethylene glycol, propylene glycol and polyethylene glycol, (1) one mole of a member selected from the group consisting of a 2,5-dihalogenoterephthalic acid and a 2,5-dihalogenoterephthalic acid ester with (2) one mole of a monocyclic carbocyclic aromatic amine, wherein from 1 to 2 of the positions ortho to the amino group are free, whereby a monohalogeno-monoarylamino-terephthalic acid compound is obtained, and (II) reacting, at a temperature between 70° and 160° C. and within a pH range of from 2 to 12 in contact with (A) copper catalyst, (B) acid-binding agent, and (C) polar solvent selected from the group consisting of water, low molecular alcohol of from 1 to 4 carbon atoms, glycerine, ethylene glycol, propylene glycol and polyethylene glycol, (3) one mole of said monohalogeno-monoarylamino-terephthalic acid compound with (4) one mole of a member selected from the group consisting of (a) the same aromatic amine as employed in step I, (b) another monocyclic carbocyclic aromatic amine wherein from 1 to 2 of the positions ortho to the amino group are free and (c) a mixture of said aromatic amines.

References Cited by the Examiner
UNITED STATES PATENTS

| | | | |
|---|---|---|---|
| 2,342,885 | 2/44 | Morgan | 8—62 |
| 2,694,713 | 11/54 | Brody | 260—279 |
| 2,726,920 | 12/55 | Federkiel et al. | 8—4 |
| 2,740,687 | 4/56 | Ham | 8—4 |
| 2,821,529 | 1/58 | Struve | 260—279 |
| 2,821,530 | 1/58 | Struve | 260—279 |
| 2,830,990 | 4/58 | Struve | 260—279 |
| 2,844,485 | 7/58 | Struve | 260—279 |
| 2,906,590 | 9/59 | Evans | 8—62 |

FOREIGN PATENTS

| | | |
|---|---|---|
| 602,334 | 5/48 | Great Britain. |

OTHER REFERENCES

Borckmann et al.: Ber. Deut. Chem., volume 89, pages 1379–1397 (1956), pages 1392, 1396 and 1397 apply.

Lemstedt et al.: Ber. der Deut. Chem., volume 70, page 1526 (1937).

Lesnianski et al.: Roczniki Chemji, volume 6, page 890, 1926.

Liebermann: Annalen, volume 518 (1935), pages 245–260, pages 245–6 relied on.

Organic Synthesis, volume XIX, pages 6–9 (1939).

Tuttle: J.A.C.S., volume 45, page 1906 (1923).

Wilkinson et al.: J. Chem. Soc. (London), 1948, pages 32–5 (page 35 relied on).

Uhlig: Angewandte Chemie, volume 66, pages 435–436 (1954).

NICHOLAS S. RIZZO, *Primary Examiner.*

IRVING MARCUS, HERBERT J. LIDOFF, WALTER A. MODANCE, *Examiners.*